US005099963A

United States Patent [19]

Alchin

[11] Patent Number: 5,099,963

[45] Date of Patent: Mar. 31, 1992

[54] SASH WINDOW BRAKE

[75] Inventor: Michael B. Alchin, Orchard Hills, Australia

[73] Assignee: Alchin & Long Groutp Pty Ltd., Wetherill Park, Australia

[21] Appl. No.: 597,139

[22] Filed: Oct. 15, 1990

[30] Foreign Application Priority Data

Nov. 13, 1989 [AU] Australia .............................. PJ7351

[51] Int. Cl.[5] .............................................. F16D 51/60

[52] U.S. Cl. ...................................... 188/136; 16/193; 49/415

[58] Field of Search .................. 188/136, 343; 49/414, 49/415, 429, 430, 445; 16/193, 197, DIG. 16

[56] References Cited

U.S. PATENT DOCUMENTS 4,571,887 2/1986 Haltof .................................. 49/415

*Primary Examiner*—Robert J. Oberleitner
*Assistant Examiner*—Chris Schwartz
*Attorney, Agent, or Firm*—Townsend and Townsend

[57] ABSTRACT

A brake is provided for sash windows. The brake comprises a frame having symmetrical and opposed arms, each arm comprising an outwardly facing brake pad area and inwardly, downwardly facing ramps. A wedge member is slidably received between the arms. The ramp and wedges cooperate to spread the arms as the wedge member is withdrawn from the frame.

4 Claims, 3 Drawing Sheets

SASH WINDOW BRAKE

FIELD OF THE INVENTION

The present invention relates to sash windows and more particularly to a brake system for sash windows.

BACKGROUND ART

Sash windows consists of a window jamb including vertical members which slidably receive a window panel usually including a glass sheet. It has been the practice to provide a balance system for the window so that it may be retained in a raised position. However, it is known that balance systems for sash windows are not always reliable, are complex and generally expensive.

OBJECT OF THE INVENTION

It is therefore the object of the present invention to substantially ameliorate the disadvantages of the prior art and provide an alternative to sash window balances.

SUMMARY OF THE INVENTION

A sash window balance assembly comprises a generally U-shaped main frame which receives therein an inner wedge member. The main frame is characterised by opposing arms, each of which bears an outwardly facing friction pad.

BEST MODE AND OTHER EMBODIMENTS OF THE PRESENT INVENTION

Figure 1:
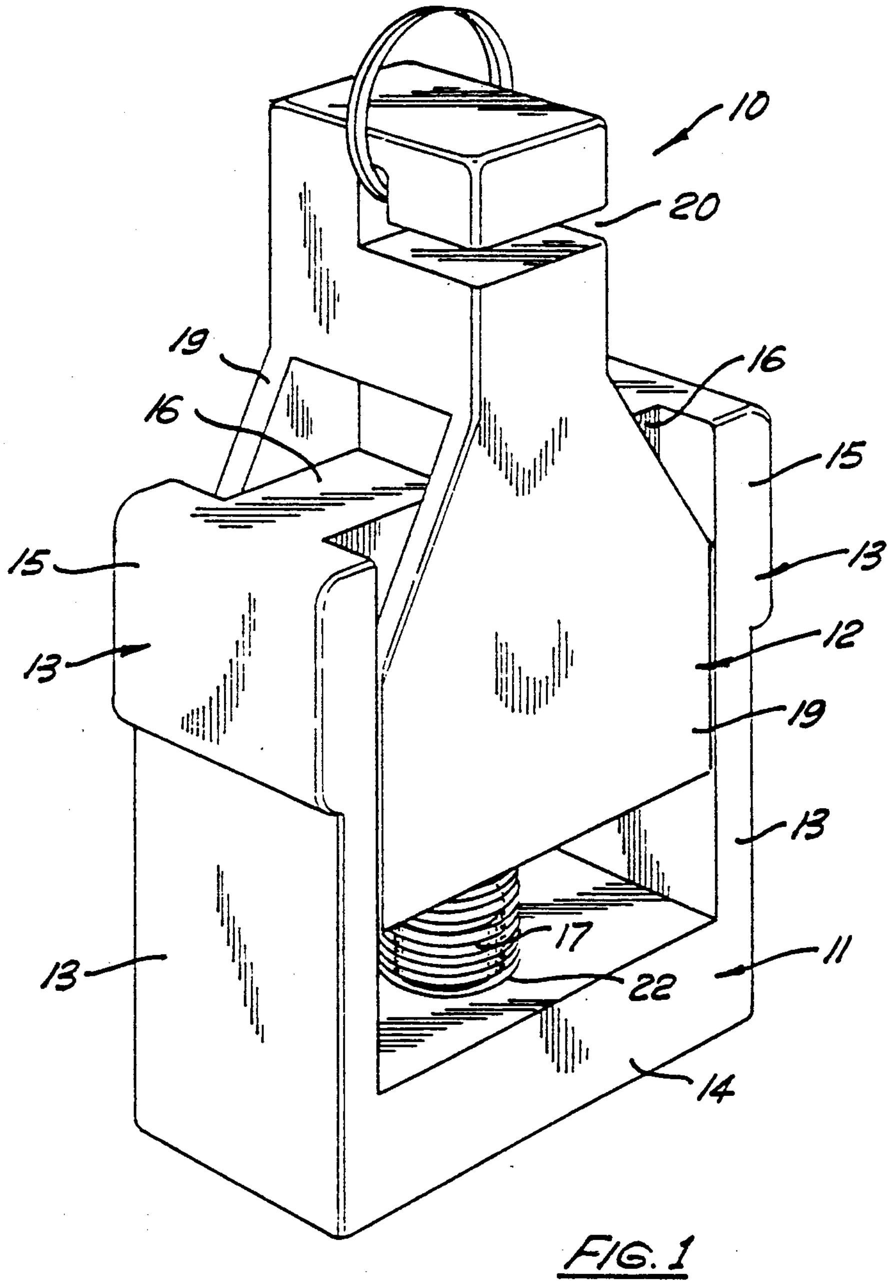
FIG. 1 is a perspective view of a sash window brake according to the teachings of the present invention.

As shown in FIG. 1, a window brake according to the present invention comprises a main frame 11 and a wedge member 12. As shown in more detail in FIGS. 2, 3 and 4, the main frame 11 includes generally symmetrical opposing arms 13 connected by a base 14. The upper portion of each arm terminates in a brake pad area 15 which may be enlarged if required. Each arm 13 also includes an inward and downwardly facing wedge portion 16. Protruding upwardly from the base 14 there is a small stub 17.

Figure 5:
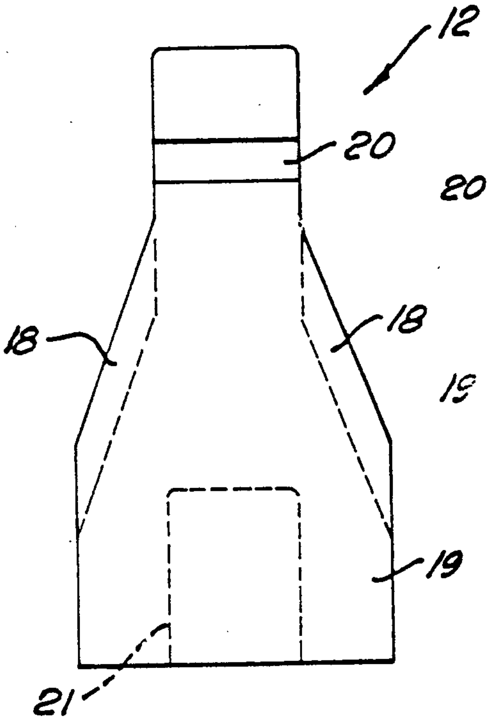
FIG. 5 is a front elevation of a wedge member made in accordance with the teachings of the present invention.
Figure 6:
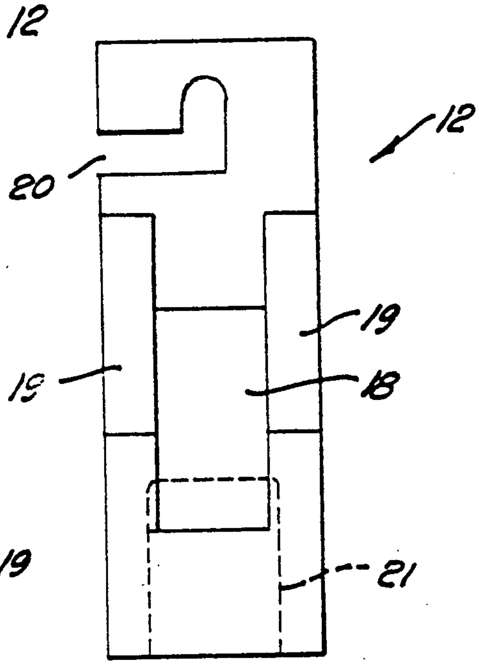
FIG. 6 is a side elevation of the wedge member depicted in FIG. 5.
Figure 7:
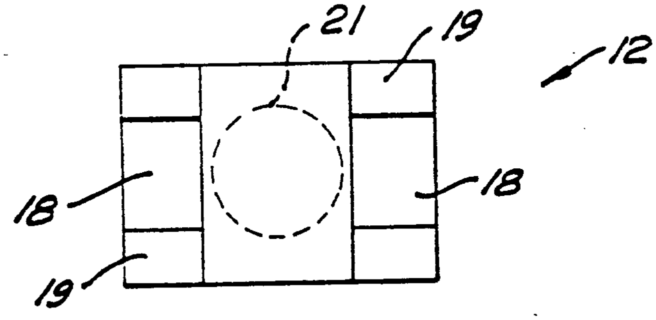
FIG. 7 is a bottom plan view of the wedge member illustrated in FIGS. 5 and 6.

The wedge member 12 is slidably received within the main frame 11. As shown more clearly in FIGS. 5, 6 and 7, the wedge member 12 preferably includes opposed upwardly facing wedges or ramps 18 which slidably contact the downwardly facing wedges 16 of the main frame 11. The wedge member 12 further includes side panels 19 which orient and locate the wedge member with respect to the main frame. The top portion of the wedge member comprises a slot or other retention means 20 for retaining the lower end of the balance spring of the window apparatus, as will be explained in more detail. The bottom portion of the wedge member 12 has formed therein a recess 21, which when the wedge member is received by the main frame, is generally aligned with the protruding stub 17 of the main frame.

In the preferred embodiment, a resilient spring 22 or other resilient bias is located by the protruding stub 17 and extends into the recess of 21 of the wedge member. This resilient spring 22 exerts a compressive force which tends to drive the wedge member 12 upward, thereby biasing the arms 13 of the main frame 11 apart from one another.

Figure 2:
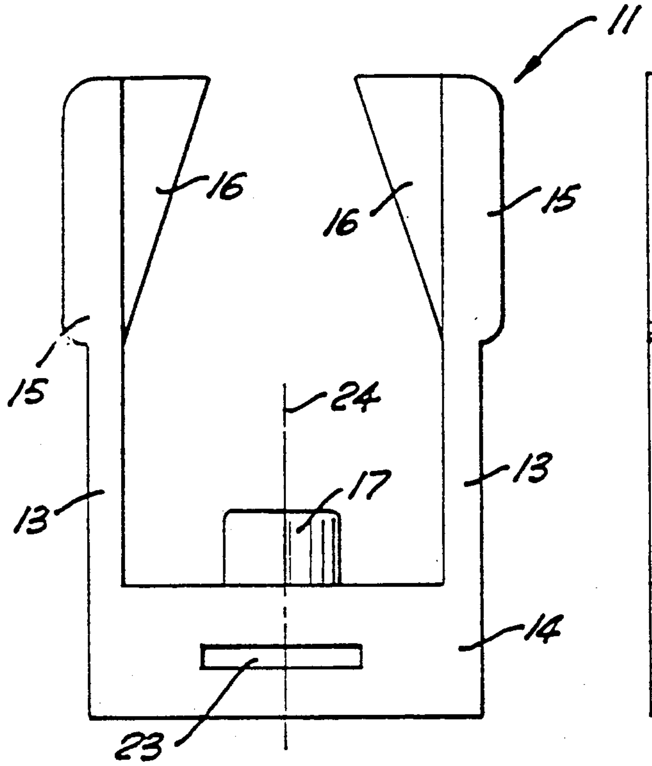
FIG. 2 is a front elevation of a main frame according to the teachings of the present invention.
Figure 3:
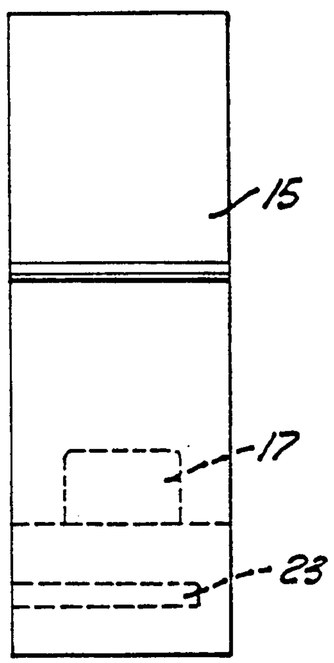
FIG. 3 is a side elevation of the main frame of FIG. 2.
Figure 4:
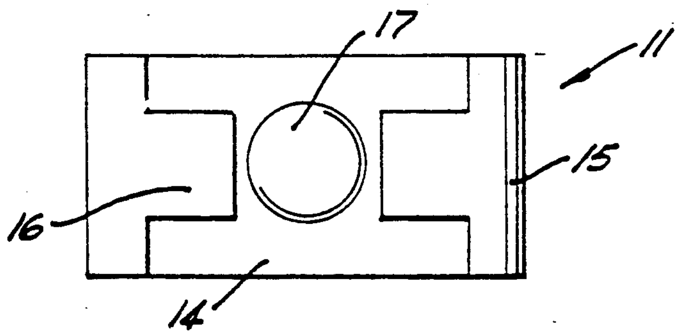
FIG. 4 is a bottom plan view of the main frame depicted in FIGS. 2 and 3.

As shown more clearly in FIGS. 2, 3 and 4, the main frame further includes a slot or aperture 23 perpendicular to the main axis 24 of the main frame. To use the brake, a small metal tab is affixed to the bottom portion of a sliding sash window. The tab, which may have barbed projections for better retaining the main frame is inserted into the slot 23, thereby affixing the main frame 11 to the bottom portion of the sash.

It will be understood that the jamb frame which receives the sash includes a track or groove in which the sash is vertically slidable. An elongated spring is suspended within the groove or track from the top of said track. The bottom of the elongated spring attaches to the retaining slot 20 of the wedge member 12. The tension in this elongated spring aids in retaining the sash panel in a desired position relative to the jamb frame. The elongated spring is in a condition of maximum tension when the sash is fully lowered. The tension exerted by the elongated spring directs the wedge member upwardly, thus tending to separate the arms 13 of the main frame 11, which in turn creates a frictional engagement with the groove or track, thus tending to maintain the sash in a fixed position. In the raised position the elongated spring is in a condition of minimum tension whereupon the upwardly directed force on the wedge is at a minimum. It is for this purpose that the coil spring 22 is provided. The coil spring 22 tends to drive the wedge member 12 upwardly, creating a braking action, should the tensile force exerted by the elongated spring be insufficient.

It will be appreciated that the brake mechanism disclosed by the present invention is, in a sense, self sizing. By this it is meant that the braking force exerted by the opposed arms 13 against the groove or track is proportional to the tension in the elongated spring which supports the sash. Thus, in a large window where a large spring balances a large sash, a larger tensile force operates on the wedge member 12, which in turn creates a larger braking force by the opposed arms 13. In this way, one size brake may be used in a number of different window sizes and will exert a suitable braking force in each different window size.

Glass filled "NYLON 66" is considered a suitable material for the construction of both the main frame 11 and the wedge member 12.

While the present invention has been described with reference to particular materials and details of construction, these will be understood as having been provided by way of example and not as limitations to the scope or spirit of the invention.

What I claim is:

1. A sash window brake comprising:

a main frame of a generally u-shaped configuration so as to have a pair of generally parallel co-extensive legs joined by a base, free ends of said legs including transversely outwardly facing brake pad areas, an internal ramp surface on each leg arranged so that the ramp surfaces converge away from said base, said frame being formed of resilient material so that said legs are resiliently transversely reflectable;

a wedge member generally captively located between said legs and movable generally longitudinally relative thereto, said wedge member having a pair of wedge faces, with each wedge face co-operating with an associated ramp face so that said wedge faces diverge towards said base, said wedge member upon movement away from said base towards the free ends of said legs causing resilient transverse outward deflection of said legs as a result of the co-operation of the wedge and ramp surfaces to move said brake pad areas into frictional engagement with a supporting window frame; and spring means extending between said base and wedge member biasing said wedge member to deflect said legs transversely outwardly.

2. The sash window brake of claim 1, wherein said base is provided with means to secure said spring means position.

3. The sash window brake of claim 2, wherein said spring means is a helical spring which is held in compression between said base and wedge member, and the means to retain said spring in position is a projection.

4. The sash window brake of claim 1, 2 or 3 wherein said brake pad areas are spaced transversely outwardly from the remainder of said legs to aid in maintaining only brake pad areas in contact with said window frame.

* * * * *